(12) United States Patent
Held, III et al.

(10) Patent No.: US 7,579,088 B2
(45) Date of Patent: Aug. 25, 2009

(54) INCREASING AND MAINTAINING THE HYDROPHILIC NATURE OF AN OXIDIZED PLASTIC SURFACE

(75) Inventors: Theodore D. Held, III, Grosse Pointe Farms, MI (US); William E. Fristad, Rochester Hills, MI (US)

(73) Assignee: Henkel Kommanditgesellschaft auf Aktien (Henkel KGaA), Dusseldorf (DE)

(*) Notice: Subject to any disclaimer, the term of this patent is extended or adjusted under 35 U.S.C. 154(b) by 630 days.

(21) Appl. No.: 11/001,727

(22) Filed: Dec. 2, 2004

(65) Prior Publication Data

US 2006/0121284 A1    Jun. 8, 2006

(51) Int. Cl.
*B32B 5/16* (2006.01)

(52) U.S. Cl. .................. 428/500; 428/506; 427/322; 427/337; 427/384; 427/412.1; 427/534; 427/535; 427/536; 526/312

(58) Field of Classification Search .................. 428/500, 428/506; 526/312, 342; 427/322, 337, 384, 427/412.1, 534, 535, 536
See application file for complete search history.

(56) References Cited

U.S. PATENT DOCUMENTS

| | | | |
|---|---|---|---|
| 4,376,000 A | 3/1983 | Lindert | |
| 4,421,780 A | 12/1983 | Buzio et al. | |
| 4,433,015 A * | 2/1984 | Lindert | 427/388.4 |
| 4,457,790 A | 7/1984 | Lindert et al. | |
| 4,517,028 A * | 5/1985 | Lindert | 148/251 |
| 4,944,812 A | 7/1990 | Lindert et al. | |
| 4,963,596 A * | 10/1990 | Lindert et al. | 526/313 |
| 4,970,264 A * | 11/1990 | Lindert et al. | 525/328.8 |
| 5,039,770 A * | 8/1991 | Lindert et al. | 526/312 |
| 5,063,089 A | 11/1991 | Lindert et al. | |
| 5,068,299 A | 11/1991 | Lindert et al. | |
| 5,116,912 A | 5/1992 | Lindert et al. | |
| 5,266,410 A | 11/1993 | Lindert et al. | |
| 5,298,289 A | 3/1994 | Lindert et al. | |
| 5,702,772 A | 12/1997 | Skelly et al. | |
| 5,879,757 A | 3/1999 | Gutowski et al. | |
| 5,922,161 A | 7/1999 | Wu et al. | |
| 6,217,687 B1 | 4/2001 | Shibata et al. | |
| 6,406,748 B2 | 6/2002 | Held, III et al. | |

* cited by examiner

*Primary Examiner*—Leszek Kiliman
(74) *Attorney, Agent, or Firm*—Brooks Kushman P.C.

(57) ABSTRACT

In at least one embodiment, the present invention relates to a increasing the hydrophilicity of an organic surface. One method in accordance with the present invention includes oxidizing at least a portion of the organic surface to form an oxidized surface portion, and treating the oxidized surfaces portion with an aqueous treatment solution comprising water-soluble and/or water-dispersible polyphenoresin. In at least another embodiment, the present invention relates to preventing the formation of coating defects in polymeric coated surfaces. In at least one embodiment, the present invention relates to increasing paint, ink, and adhesive adhesion.

29 Claims, No Drawings

INCREASING AND MAINTAINING THE HYDROPHILIC NATURE OF AN OXIDIZED PLASTIC SURFACE

BACKGROUND OF THE INVENTION

1. Field of the Invention

This invention relates to increasing and maintaining the hydrophilic nature of an oxidized plastic surface.

2. Background Art

Automobiles have typically been constructed of metal parts, the outer surfaces of which have been coated to provide a smooth showroom finish. The materials used to coat the metal parts comprise predominantly organic polymeric materials, or paints, such as lacquers, polyurethanes, acrylics and such, all of which provide a durable and attractive finish. More recently, automobile manufacturers have incorporated certain plastic parts into the automobile assembly process to reduce weight and improve rustproofing properties. Examples of the plastics used to form those parts include SMC (Sheet Molding Compound), polyolefins such as polypropylene (PP), polyethylene (PE, HPPE, LDPE), and olefinic blends or alloys, such as TPO (Thermoplastic Polyolefin) such as those used in the automotive industry, thermoset polyurethanes (PUR, RIM, RIMM), and thermoplastic polyurethanes (TPU), to name a few. The introduction of plastic parts into automotive assemblies has presented the automotive industry with unique challenges including the ability to maintain a uniform, constant color showroom finish on the different substrate materials. Various methods have been adopted to achieve this goal.

Typically, many of the parts making up an automotive assembly are not manufactured by the original equipment manufacturer ("OEM") but are produced by suppliers at sites distant from where the final automobile assembly takes place. The plastic parts included in the assembly are normally molded and assembled at supplier facilities where their production and priming (in most cases) is also complex. If the plastic parts and metal parts are not subjected to a common coating or painting operation, differences in color tone and/or "look" of the coating films between the two types of materials may remain after the finish coating. It may therefore be difficult to color match both types of parts in this type of operation and more difficult to ensure the quality of the finish due to handling contamination. Therefore, many automobile manufacturers choose to precondition the entire assembly of parts, and paint the completed assembly that includes the plastic parts and the metal parts, referred to as the "body-in-white".

The assembly plant receives the finished plastic component, where it is included in the automotive assembly, after which such components may be subjected to a variety of processes at the same time as the metal parts. These processes include steps leading up to the application of the finish coating of paint to the plastic and metal parts. More specifically, the manufacturing facility assembles the metal parts and plastic body parts into the automotive body-in-white, sends the body-in-white through several pretreatment steps and corrosion resistance processes, and lastly applies the final finish using a series of coating steps. These basic steps encompass the spraying, or dipping, of the assembly with a sequence of aqueous compositions that are recycled in a continuous manner and thereby contact newly assembled plastic and coated metal parts with aqueous compositions that have been in contact with previously treated assemblies of parts. In particular, the pretreatment operation typically comprises the steps of a power wash, a phosphate treatment, and an electro-coating process, each of which may employ an aqueous spray and/or aqueous bath dip process.

The assembly line coating of sheet metal-plastic hybrid assemblies presents problems relating to the actual coating processes and conditions. Since the physical and chemical properties of the plastic parts differ significantly from those of the metal parts, each step in the coating operation must be designed to be compatible with each type of surface. Furthermore, the end result, a showroom quality paint finish, must be practically identical for both the plastic and metal parts. The final properties of color matching, color depth, smoothness, luster, reflectivity, among others, must be substantially uniform through all visible surfaces of the finish coat assembly.

While manufacturers have been successful in designing a series of coating process steps applicable to both plastic and sheet metal parts to achieve the aforementioned goals, the automation of this process has not been altogether successful. One of the daunting problems in coating the plastic and metal parts-containing assembly has been the appearance of defects in the surface quality of the plastic parts and/or metal parts that are pretreated with one or more coatings of organic primer material. These defects manifest as surface irregularities in the final painted surfaces that detract from the acceptability of the end product. To achieve the desired factory fresh showroom finish, manufacturers find it necessary to employ time consuming manual labor to prevent these defects from appearing or to repair such defects after they appear. This of course increases the cost of the overall coating operation.

To this day, hand wiping of the assembly at various stages prior to final coating is a way, inelegant as it may seem, by which the industry has addressed the surface defect problem. Although many sources of contamination resulting in the organic surface defects are possible, a major source of contamination arises from the physical removal of uncured resin particles from the metal surfaces of assemblies undergoing the coating operation. These particles can originate with the sealers, sound deadeners, mastics and/or adhesives applied to selected portions of parts, predominately the metal parts, used in the automobile body construction, are removed therefrom by the physical forces present during the aqueous pretreatment steps, and can become suspended in the recycling aqueous compositions. On application of the aqueous composition to the sheet metal-plastic assemblies, these particles can be redeposited on the organic surfaces, or in other words transferred from the resin-treated metal surfaces to the organic surfaces. Upon curing of the final coating, the redeposited particles can cause surface irregularities or defects in the finish coat.

These particles tend to redeposit on the organic surfaces because of the hydrophobic nature of the organic surfaces. In an effort to prevent this redeposition, the automotive industry has tried to increase hydrophilicity of the surfaces by oxidizing these surfaces prior to exposing them to the aqueous compositions. This technique is bound in the theory that increasing the hydrophilicity of the organic surfaces will prevent the undesired redeposition. While this approach has a sound theoretical basis, in practice it has been found to be somewhat ineffective. This is because it has been discovered that these surfaces that have been oxidized to become hydrophilic in nature, tend to loose their hydrophilicity over time and with exposure to humidity.

It may seem to be the logical solution to oxidize these surfaces just prior to exposing them to the aqueous compositions. However, while this application may work in theory, it is not such a viable option in practice. This is because the most common approach to oxidizing the surfaces is to expose them to flame treatment. However, automobile manufactures prefer not to have flames nearby to the coating process. As such, the oxidation process usually takes place at an offsite location, where days, weeks, or months can transpire before subsequent coating occurs.

The above is just one description of a specific process employing oxidized plastic surfaces and the problems that can result. There are many other applications that require plastic surfaces to be oxidized to render them relatively more hydrophilic. For instance, plastic surfaces are usually oxidized to make them more hydrophilic so they can accept paint, ink, or adhesives better.

These oxidized surfaces face the same problems as those described above. They tend to revert back to a more hydrophobic state over time. This causes timing issues for processes employing oxidized plastic surfaces.

Polyphenol compounds have long been used in the metal finishing art for the treating of metal surfaces to provide a coating on the metal surfaces which is effective in enhancing the corrosion resistance and paint adhesion characteristics of the metal surfaces. Such polyphenol compounds are disclosed in U.S. Pat. Nos. 4,433,015, 4,517,028, 4,963,596, 4,970,264 and 5,039,770, which are incorporated herein by reference. These compounds have not been used before to treat oxidized organic surfaces.

Accordingly, it would be desirable to provide a method of increasing the hydrophilicity of organic surfaces for relatively extended periods of time. It would also be desirable to provide a method of improving adhesion of paint, ink, and adhesives. It would also be further desirable to provide a method of preventing particle redeposition onto organic surfaces which is not time dependent.

SUMMARY OF THE INVENTION

The present invention relates to a method for increasing and maintaining the hydrophilicity of an aqueous organic surface over a period of time. The method comprises oxidizing at least a portion of the organic surface, and treating the oxidized organic surface portion with an aqueous treatment solution comprising water-soluble and/or water-dispersible polyphenol resin. In at least one embodiment, the polyphenol resin comprises an amine-containing resin having at least 10 amine groups per molecule and a number average molecular weight of at least 1,000 g/mole.

Another aspect of the present invention is a method of preventing the formation of coating defects in polymeric coated surfaces in a coating process comprising a plurality of steps that occur prior to the polymeric coating of the surfaces and that contact organic and metal surfaces with a plurality of aqueous compositions in which accumulate in suspension resin particles released from the metal surfaces, comprising:
  (1) oxidizing the organic surfaces;
  (2) exposing the oxidized organic surfaces with an aqueous treatment solution comprising water-soluble and/or water-dispersible polyphenol resin;
  (3) contacting the treated oxidized surfaces with a plurality of aqueous compositions containing the particles; and
  (4) removing the surfaces from the plurality of aqueous compositions.

A further aspect of the present invention is an assembly line coating operation comprising the application of an hydrophobic sealer resin onto portions of metal parts combined with parts having organic surfaces in an assembly, contacting the assembly with a plurality of aqueous compositions, applying one or more finish coats to the surfaces of the assembly, and curing the finish coats, the improvement comprising:
  (1) oxidizing the surfaces of the organic surface parts;
  (2) exposing the oxidized organic surfaces with an aqueous treatment solution comprising water-soluble and/or water-dispersible polyphenol resin;
  (3) contacting the assembly with a plurality of the aqueous compositions;
  (4) removing the assembly from each of the plurality of aqueous compositions; and
  (5) reusing the aqueous compositions with additional assemblies comprising the sealer treated metal parts and the flame treated organic surface parts.

DETAILED DESCRIPTION OF THE PREFERRED EMBODIMENTS

Except in the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counter-ions to produce electrical neutrality for the composition as a whole (any counter-ions thus implicitly specified should preferably be selected from among other constituents explicitly specified in ionic form, to the extent possible; otherwise such counter-ions may be freely selected, except for avoiding counter-ions that act adversely to the objects of the invention); the first definition of an acronym or other abbreviation applies to all subsequent uses herein of the same abbreviation and applies mutatis mutandis to normal grammatical variations of the initially defined abbreviation; the term "paint" includes all like materials that may be designated by more specialized terms such as lacquer, enamel, varnish, shellac, topcoat, and the like; and the term "mole" and its variations may be applied to elemental, ionic, and any other chemical species defined by number and type of atoms present, as well as to compounds with well defined molecules.

Definitions

The following terms are used throughout the specification and are intended to have the following meanings:

"Hydrophobic" as used herein means a material having little or no affinity for water.

"Hydrophilic" as used herein means the opposite of hydrophobic, that is a material having affinity for water.

"Flame treating" as used herein means the contacting of a surface with a high temperature gas combustion product of a mixture comprising oxygen and at least one fuel such as hydrogen gas or a hydrocarbon.

"Organic" as used herein means a chemical compound including carbon and at least one or more of hydrogen, oxygen, nitrogen, sulfur, and/or silicon.

"Oxidized" as used herein means that a material has increased its oxygen content by the introduction, into a material, of oxygen atoms in the form of molecular functional groups containing oxygen. Exemplary functional groups include hydroxyl, carbonyl, carboxyl, peroxy, oxy, siloxy, nitroxy, and the like. Oxidizing a plastic surface operates to increase the relative hydrophilicity of the surface. As such, herein, oxidized could sometimes be used interchangeably with hydrophilic.

"Plastic" as used herein means an organic material that at one point in time is capable of attaining a desired shape through processing such as molding, casting or extrusion, and which may retain its moldable properties or thermoplastic properties or lose those properties and become fixed or thermoset. Exemplary plastics include naturally derived and synthetically produced polymeric materials.

A "plastic composition" may include one or more additives, such as reinforcing elements or fillers, such as glass fibers, pigments such as calcium carbonate, or plasticizers, UV-light absorbers and mold release agents. Exemplary thermoset plastic compositions may comprise reaction injection molded (RIM) polyurethane polymers, sheet molded compound (SMC), unsaturated polyesters and injection-molded bulk-molding compound (BMC) unsaturated polyesters.

"Polymer" as used herein means a high molecular weight organic molecule consisting of straight chains or branched chains or mixtures thereof, made up of repeating monomeric units linked together with covalent bonds. The term includes homopolymers, where the repeating unit is identical throughout the polymeric chain, co-polymers, where more than one type of monomeric units is present by design or randomly throughout the polymer chain, or block copolymers, where sections of the polymer can be predominantly of one type of monomeric unit. The polymers may be derived from natural sources such as rubber or produced synthetically through polymerization reactions known in the art. Exemplary polymers used to produce parts or to coat metal surfaces to be treated according to the present invention include polyolefins, such as polyethylene, polypropylene, polybutylene, polymethylpentene, TPO; mixtures of polyolefin polymers and copolymers of olefins; polyolefin copolymers containing olefin segments such as poly(ethylene vinylacetate), poly(ethylene methacrylate) and poly(ethylene acrylic acid); polyesters, such as poly(ethylene terephthalate), poly(butylene phthalate) and poly(ethylene naphthalate); acetates such as cellulose acetate, cellulose triacetate and cellulose acetate/butyrate; polyamides such as poly(hexamethylene adipamide); polyurethanes; polycarbonates; acrylics such as poly(methyl methacrylate); polystyrenes and styrene-based copolymers; vinylics such as poly(vinyl chloride), poly(vinylidene dichloride), poly(vinyl alcohol) and poly(vinyl butyral); ether oxide polymers such as polypropylene oxide), poly(phenylene oxide), poly(ethylene oxide) and poly(methylene oxide); ketone polymers such as polyetheretherketone; silicones such as polydiorganosiloxane-based elastomers; epoxies; polyimides; fluoropolymers such as polytetrafluoroethylene; mixtures thereof, or copolymers thereof.

"Polymeric material" as used herein means a material comprising a polymer, polymer blends or polymer matrix compositions.

The polymer materials to be treated may be in the forms of flat sheets, films, complex shaped articles, particulate or powders, woven fabrics, and/or individual fibers. These can be solid polymeric mono-materials, laminated products or hybrid materials, or alternatively organic coatings on any type of the base substrate which can be non-metallic or metallic in nature.

"Resin" as used herein means a nonvolatile, solid or semi-solid organic substance that may be prepared from polymerization of simple molecules. A "resin composition" may include one or more additives, such as reinforcing elements or fillers, such as glass fibers, pigments such as calcium carbonate, or plasticizers, UV-light absorbers and mold release agents, as well as blowing agents and curing agents.

"Uncured Resin" as used herein means a resin that may flow and be readily divisible in the form of a powder, colloidal suspension, emulsion, or liquid, and that is capable of being transformed into a thermoset solid, or semi-solid, polymeric material upon treatment with energy in the form of heat or radiation, or when combined with a curing agent.

"Surfaces" as used herein means that part of an object that affects or can be affected by its environment. In other words, surfaces comprise the outer boundary of an object that may be immediately contacted by the environment. Polymer surfaces are unique among solid surfaces in that polymeric chains near the surface can be mobile and resemble in many respects a viscous liquid.

The present invention comprises the preservation of the hydrophilic nature of an oxidized plastic surface. In at least one embodiment, the present invention comprises oxidizing at least a portion of the organic surface, and treating the oxidized organic surface portion with an aqueous treatment solution comprising a water-soluble and/or water-dispersible polyphenol resin. In at least at least one embodiment, the polyphenol resin comprises an amine-containing resin having at least 10 amine groups per molecule and a number average molecular weight of at least 1,000 g/mole.

The present invention will be described below in greater detail in connection with its applicability to an automotive coating process. This description should not be construed to be limiting at all to only this application/process. There are many other applications that require plastic surfaces to be oxidized to render them relatively more hydrophilic for which the present invention is useful with. For instance, plastic surfaces are usually oxidized to make them more hydrophilic so they can accept paint and adhesives better. The present invention is intended to be applicable to all applications/processes where increasing and monitoring the hydrophilicity of an oxidized plastic surface is desired.

Description of the Automotive Coating Process

The coating of automobile assembly parts can vary from manufacturer to manufacturer, but problems associated with coating an assembly consisting of sheet metal and organic surfaces where the combined metal and plastic body-in-white assembly process passes through a phosphate e-coat coating line are present in all such operations. This is particularly true in cases where the manufacturer uses resinous sealers, mastics, sound deadeners, and adhesives that are cured only after the finish paint has been applied. As noted above, surface defect problems associated with the practice of such assembly line coating operations on organic surfaces are believed to occur as a result of the redeposition of uncured resin particles suspended in the aqueous compositions contacted with the organic surfaces of parts prior to curing. The opportunities for this redeposition are more clearly understood by reference to the following generic automotive coating operation.

The formed sheet metal parts, usually sheet steel, galvanized steel, or aluminum, are typically treated on selected surfaces, such as joints, edges and unseen surfaces, prior to the assembly operation. These portions of the metal parts are treated with sealer compositions, such as vinyl plastisols, sound deadener resins, and a variety of mastics or adhesives. These resinous materials are predominantly hydrophobic in character, and are applied in a form of a thickened liquid or caulk which is uncured, that is not "set", or in a partially cured state. Upon subsequent chemical treatment or physical conditioning, such as the application of heat or radiation, the uncured material will set up or fully polymerize or solidify and form a substantially continuous solid layer of cured hydrophobic material. These materials may be applied to the metal parts prior to assembly, or after assembly of the parts into the body-in-white. These materials may be applied to the selected surfaces by brush, applicator, spraying, dipping, electrostatic, electrocoating or other standard treatment application methods.

The assembly containing the treated metal parts, organic coated metal parts and plastic parts is then subjected to a variety of process steps including one or more of the following treatments: a washing treatment which may be carried out in a spray system; a degreasing or cleaning treatment which may employ singly or jointly a spray system and/or a dipping system using a formulated aqueous solution including for example, surfactant and other organic and inorganic compounds such as phosphates and/or silicates; a cold washing treatment using a spray system; a chemical conversion treatment spraying with or by dipping in an aqueous solution of metallic phosphate; which may be followed by a cold washing treatment using a spray system and/or a dipping system. In all these foregoing processes, the aqueous compositions applied to the assembly surfaces may be filtered, may have chemicals added periodically to make up for depletion, and are reused in the assembly line process.

The pretreated assembly is then subjected to an electrocoating process that applies a paint layer or undercoating layer primarily to the sheet metal surfaces; however, electrically conductive plastic materials may also be used and coated as well (see for example the disclosure of U.S. Pat. No. 4,974,307). Dipping the assembled parts into an electrodeposition cell may apply the electrodeposition coating. The coating ingredients may thereby be applied substantially uniformly onto the surfaces of the sheet metal parts and, optionally, of any electrically conductive plastic parts, to produce a relatively uniform coating film. The coated assembly may then be subjected to elevated temperatures to cure the coating onto the sheet metal, and optionally onto the electrically conductive plastic parts, into a continuous paint film having high adhesiveness. Alternatively, the electrocoated assembly may proceed directly through the finish coating operation, and all coating layers cured in a single step.

In the succeeding coating operations, one or more coatings may be applied before the finish is cured. An optional second protective coating process may be employed followed by the final finish coating, or the final finish coating process applied without a second protective coating. Conventional spray coating or electrostatic spray coating, followed by curing, may apply the second protective coating, and the finish coating. The cure step may either utilize normal temperature drying or more commonly baking in a curing oven, depending on the type of coating selected.

In at least one embodiment, the present invention prevents the redeposition of hydrophobic particles that become suspended in the aqueous treatment compositions onto the organic surfaces of the parts with which the compositions contact. The redeposition phenomenon is believed to arise as the result of the attraction and adhesion of the hydrophobic particles, in aqueous suspension, to the organic surfaces of the parts, which are themselves hydrophobic. Any hydrophobic surface, whether it is a plastic part or an organic coated metal part, can be susceptible to experiencing the redeposition phenomenon and act as an attractant for the hydrophobic particles suspended in the aqueous compositions used in the automotive coating process.

In at least one embodiment, the present invention is generally related to increasing (and maintaining for a predetermined period of time) the hydrophilicity of an organic surface. In at least one specific embodiment, the present invention solves the redeposition problem associated with exposure to certain aqueous compositions by maintaining the suspended particles in the aqueous phase during the contacting with the treated organic surfaces. The process reduces the hydrophobic attraction between the particles and the organic surfaces by modifying the properties of the organic surfaces to increase the hydrophilicity thereof. As a result, the modified surfaces do not function as a hydrophobic attractant and the aqueous compositions can be removed from the assembly without depositing substantially any particles onto the modified organic surfaces.

In at least one embodiment, the surface modification of the present invention results preferably from an oxidation reaction on at least a portion, and preferably all, of the organic surface followed by exposing the oxidized surface to an aqueous solution containing a water-soluble or water-dispersible polyphenol resin. The water soluble or water dispersible polyphenol resins useable with the present invention, in at least one embodiment, preferably have molecular weights in excess of 1,000 g/mole, in other embodiments 1,000-200,000 g/mole, in yet other embodiments 2,000-70,000 g/mole, in still yet other embodiments 5,000-20,000 g/mole, and in still yet another embodiment 10,000 g/mole.

In at least one preferred embodiment, the polyphenol resin is an amine containing resin, and in other embodiments are polyamines that have at least 5 amine groups per molecule. In certain embodiments, the polyamines may have 10-100 amine groups per molecule, in other embodiments 25-75 amine groups per molecule, and in yet other embodiments 50-60 amine groups per molecule. In at least one particularly preferred embodiment, the amine containing resin is a protonated amine-containing resin.

In at least this embodiment, the pH of the aqueous solution is less than 8.5, in other embodiments 0.5-7.5, and in yet other embodiments 5.0-7.0. In at least one embodiment, the concentration of the polyphenol resin in the aqueous solution is 0.005-10.0 wt. %, in at least another embodiment 0.002-0.1 wt. % and in yet another embodiment 0.003-0.075 wt. %, in still yet other embodiments 0.005-0.05 wt. % and in still yet a further embodiment 0.015-0.04 wt. %.

Techniques of oxidizing organic surfaces, such as those used in the manufacture of automotive assemblies, are well known in the art, and include chemical oxidation such as chromic acid etching, corona discharge treatment, plasma treatment and flame treatment. Flame treatment is a well known method to oxidize polymeric material surfaces and has been described in the literature as a method of modifying the surfaces of polymeric films, as well as molded or extruded plastic articles, and to metal surfaces that have been coated with a polymeric coating. The resulting films and articles are described as providing a surface with improved adhesion to overcoatings of polymeric materials such as in painting and adhesive bonding.

In at least one embodiment, the preferred method of oxidizing the organic surfaces of the assembly parts is flame treatment. In at least one embodiment, a preferred method according to the present invention comprises contacting the organic surfaces with a flame at a temperature, distance and length of time to oxidize the surface to a depth sufficient to convert any hydrophobic character thereof to a hydrophilic character but not deep enough to alter the physical properties of the organic/plastic part. Flame treatment has the advantage of being controlled such that oxidizing the organic surface may be effected to a depth of only a few angstroms, more particularly between 40 and 90 angstroms (see Briggs et al, Journal of Materials Science, 14 (1979) 1344, at 1347). This level of treatment is sufficient to modify the surface characteristics to at least temporarily act as a hydrophilic surface as opposed to a hydrophobic surface without adversely affecting the shape, strength or other physical properties of the article.

Many types of flame treatment processes and equipment are available. Typically, flame treaters use premixed flames, i.e., the fuel and oxidizer are thoroughly mixed prior to combustion and the rate of combustion is controlled by the rate of chemical reaction that occurs in the flame. In a premixed flame, the luminous region is that portion of the flame where the temperature rise is the greatest and where much of the reaction and heat release occur. During a flame-treating process, one side of a polymer surface is passed in relatively close proximity to a flame. The other side of the polymer surface may require cooling although such cooling is not necessary for plastic parts that are as thick as typically used in automobile assemblies.

Flames are commonly described in terms of two characteristics: by the flame power and by the molar ratio of oxidizer to fuel. The flame power is the product of the volume of fuel burned per unit time and the heat content of the fuel. Typical units for the flame power are W or Btu/hr. In flame treating, the flame power can be normalized to account for the dimensions of the burner, leading to units such as $W/cm^2$ or $Btu/hr-in^2$. The exact ratio of oxidizer to fuel needed for complete combustion is known as the stoichiometric ratio. For example, the exact amount of dry air necessary for the complete combustion of methane is 9.55 volumes per volume of methane; so the stoichiometric ratio for an air: methane flame is 9.55:1. The equivalence ratio is defined as the stoichiometric oxidizer: fuel ratio divided by the actual oxidizer: fuel ratio. For fuel-lean, or oxidizing, flames, there is more than the stoichiometric amount of oxidizer and so the equivalence ratio is less than 1:1. For oxidizer: fuel mixtures at the stoichiometric ratio, the equivalence ratio is equal to 1:1. For fuel-rich systems, the equivalence ratio is greater than 1:1.

Industrial flame treaters may use a premixed laminar (as opposed to turbulent) flame with air as the oxidizer and a gaseous hydrogen containing fuel. Typical fuels include hydrogen and hydrocarbons such as natural gas, methane, ethane, propane, butane, ethylene, liquefied petroleum gas, acetylene, or blends thereof, and city gas, which is often composed of a mixture of carbon dioxide, carbon monoxide, hydrogen, methane, and nitrogen. Halogen and halogen-containing compounds have also been disclosed as oxidizer: fuel mixture additives to increase the adhesivity of polyolefin films to subsequent coatings.

In certain embodiments, hydrocarbon flames enriched with up to 5 percent additional oxygen by volume, up to 5 percent steam by weight and a few parts per million of alkali or alkaline earth metals may be used. In some embodiments, a flammable third component that is neither a fuel nor an oxidizer can be sprayed into the flame. Suitable third components include polymers such as cellulose, protein, silicones or polyethers, and inorganic materials such as carbides, nitrides, metal salts and metal oxides.

The temperature and time of contact of the flame with the organic surface being treated are variables determined by those skilled in the art. These variables are expected to change slightly depending on the organic surface being treated and the composition of the fuel used in the flame treatment device. Heating of the organic surface is generally regarded as undesirable and unnecessary to achieve the chemical reaction of the organic surface with the high-energy oxygen radicals present in the flame. In all cases, the flame temperature and time of contact with any particular section of the organic surface should be such as to oxidize the surface to an extent to render it at least temporarily hydrophilic, and not cause any undesirable consequences such as melting, deformation, charring or structural weakening of the part.

From the scientific literature, it is known that as a result of the fluid nature of polymeric surfaces, oxidized surface functional groups of polymeric materials appear to turn inward from the surface over time. The result is a loss of hydrophilic surface characteristics over time. This can post problems for OEM's since the oxidizing process may occur at distant facilities and at a relatively long time before exposure to the coating process, requiring the effects of the treatment to be more or less permanent. If the OEM chooses to combine pre-flame treated plastic parts with the metal parts into the automotive assembly, then the flame treatment must take advantage of techniques that preserve the hydrophilic character of the modified polymeric surfaces by treating the oxidized organic surface with an aqueous treatment solution comprising a water-soluble and/or water dispersible polyphenol resin.

The same consideration of OEM's for possible decay of the flamed surface will apply to any other flame treatment application where a delay between flaming and end-use of the hydrophilic surface is likely to occur.

The aqueous composition useable with the present invention comprises an effective amount of a water-soluble or -dispersible polyphenol resin in an aqueous medium. The water-soluble or -dispersible polyphenol resin employed in the present invention is selected from the group consisting of any one of the following Polymer Materials a, b, c, d (characterized below), their salts, and mixtures thereof. Salts include the acid and alkaline salts thereof.

In general, the polyphenol resins useable with the present invention are similar to those disclosed in U.S. Pat. No. 5,039,770 entitled TREATMENT AND AFTER-TREATMENT OF METAL WITH POLYPHENOL COMPOUNDS, and expressly incorporated herein by reference. However, unlike those compositions, at least a portion of the final resin Polymer Material useable with the present invention must include a "Z" moiety and further, at least a portion of the "Z" moiety must be modified by the inclusion of a mono- or polyhydroxy alkyl-amine functionality resulting from the condensation of an amine or $NH_3$ with a ketose, aldose, or other alkylaminopolyhydroxy compound, preferably having from 2 to 8 carbon atoms. Such modifications may also be made to polyphenolics other than those disclosed in U.S. Pat. No. 5,039,770, and to those polyphenolic derivatives described in U.S. Pat. No. 4,376,000 issued Mar. 8, 1983; U.S. Pat. No. 4,433,015 issued Feb. 21, 1984; and U.S. Pat. No. 4,517,028 issued May 14, 1985; all expressly incorporated herein by reference. In particular, the preferred materials of the present invention are based on certain aminosaccharide derivatives of polyphenolics which have been found useful in treating metal, especially bare aluminum metal. Further understanding of this invention will be had from the following disclosure, wherein all parts and percentages are by weight unless otherwise indicated.

The polyphenol resins useable with the present inventions are polymer Materials (a)-(d) below, their salts, and mixtures thereof. The treatment compositions useable with the present invention comprise an effective amount of a soluble or dispersible treatment polyphenol resin (Polymer Material) in a carrier, such as water, or other aqueous mixtures and co-solvents, that is suitable for organic surface treatment, i.e., one that allows the selected polymer Material to be deposited or otherwise placed on an organic surface. The soluble or dispersible polyphenol resin employed in the present invention is selected from the group consisting of any one of the following Polymer Materials (a)-(d) (characterized below), solutions or dispersions of these Polymer Materials, their salts, and mixtures thereof. Salts include the acid and alkaline salts thereof.

Polymer Material (a)

Polymer Material (a) comprises a polymer material having at least one unit having the formula:

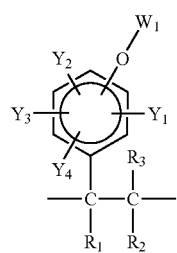

where:

$R_1$ through $R_3$ are independently selected for each of the units from the group consisting of hydrogen, an alkyl group having from 1 to 5 carbon atoms, or an aryl group having 6 to 18 carbon atoms;

$Y_1$ through $Y_4$ are independently selected for each of the units from the group consisting of hydrogen, $—CR_{11}R_5OR_6$, $—CH_2Cl$, or an alkyl or aryl group having from 1 to 18 carbon atoms, or Z;

Z is

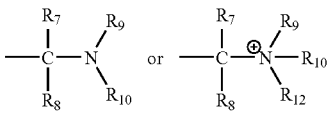

however, at least a fraction of the $Y_1, Y, Y_3$ or $Y_4$ of the final compound or material must be Z and at least a fraction of the Z must contain a mono- or polyhydroxy alkyl-amine functionality resulting from the condensation of an amine or $NH_3$ and a ketose, aldose or other alkylaminopolyhydroxy compound having from 2 to 8 carbon atoms followed by reduction to an amine (from the imine);

$R_5$ through $R_{12}$ are independently selected for each of the units from the group consisting of hydrogen, an alkyl, aryl, hydroxy-alkyl, amino-alkyl, mercapto-alkyl, or phospho-alkyl moiety; $R_{12}$ can also be $—O^{(-1)}$ or $—OH$, in order to form an amine oxide or a hydroxylamine; and $W_1$ is independently selected for each of the units from the group consisting of hydrogen; an acyl moiety; an acetyl; a benzoyl moiety; 3-allyloxy-2-hydroxy-propyl-; 3-benzyloxy-2-hydroxy-propyl-; 3-alkylbenzyloxy-2-hydroxy-propyl-; 3-phenoxy-2-hydroxy-propyl-; 3-alkylphenoxy-2-hydroxy-propyl-; 3-butoxy-2-hydroxy-propyl; 3-alkyloxy-2-hydroxy-propyl; 2-hydroxyoctyl-; 2-hydroxy-alkyl-; 2-hydroxy-2-phenyl ethyl-; 2-hydroxy-2-alkyl phenyl ethyl-; benzyl-; methyl-; ethyl-; propyl-; alkyl; allyl; alkyl benzyl-; haloalkyl-; haloalkenyl-; 2-chloro-propenyl-; sodium, potassium; tetra aryl ammonium; tetra alkyl ammonium; tetra alkyl phosphonium; tetra aryl phosphonium; or a condensation product of ethylene oxide, propylene oxide, a mixture, or copolymer thereof.

Preferred final materials are based on a vinyl phenolic moiety or methyl vinyl phenolic moiety. For example, vinyl phenol isopropenyl phenol and derivatives thereof may be used.

It will be appreciated that the depiction above represents a repeating unit that characterizes the compound or materials useable with the present invention; no terminating end units are depicted. The end group not depicted of the polymers useable with the present invention can be selected by the skilled artisan relying upon art-disclosed techniques. For example, the end groups of the polymer may be one of those resulting from the specific polymerization process employed or those intentionally added to alter the polymer characteristics. For example, the end groups may be hydrogen, hydroxyl, initiation fragments, chain transfer agents, disproptionation groups, or other similar methods of terminating a growing polymer chain.

Polymer Material (b)

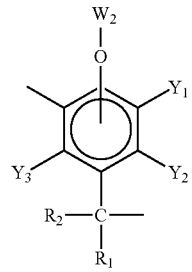

Polymer Material (b) comprises a resin material having at least one unit having the formula:

wherein:

$R_1$ through $R_2$ are independently selected for each of the units from the group consisting of hydrogen, an alkyl group having from 1 to 5 carbon atoms, or an aryl group having from 6 to 18 carbon atoms;

$Y_1$ through $Y_3$ are independently selected for each of the units from the group consisting of hydrogen, $—CR_4R_5OR_6$, $—CH_2Cl$, an alkyl or aryl group having from 1 to 18 carbon atoms, or Z, Z is

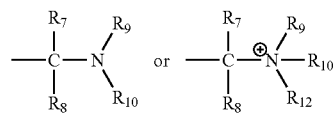

but, at least a fraction of the $Y_1, Y_2,$ or $Y_3$ of the final compound must be Z, and at least a fraction of the Z must contain a mono- or polyhydroxy alkyl-amine functionality resulting from the condensation of an amine or $NH_3$ and a ketose, aldose or other alkylaminopolyhydroxy compound having from 2 to 8 carbon atoms;

$R_4$ through $R_{12}$ are independently selected for each of the units from the group consisting of hydrogen, or an alkyl, aryl, hydroxy-alkyl, amino-alky, mercapto-alkyl or phospho-alkyl moiety; $R_{12}$ may also be $—OH_{(-1)}$ in order to form an amine oxide or a hydroxylamine; and $W_2$ is independently selected for each of the units from the group consisting of hydrogen; an acyl moiety; acetyl; benzoyl; 3-allyloxy-2-hydroxy-propyl-; 3-benzyloxy-2-hydroxy-propyl-; 3-alkylbenzyloxy-2-hydroxy-propyl-; 3-phenoxy-2-hydroxy-propyl-; 3-alkylphenoxy-2-hydroxy-propyl-; 3-butoxy-2-hydroxy-propyl-; 3-alkyloxy-2-hydroxy-propyl-; 2-hydroxyoctyl-; 2-hydroxy-alkyl-; 2-hydroxy-2-phenyl-ethyl-; 2-hydroxy-2-alkyl-phenyl-ethyl-; benzyl-; methyl-; ethyl-propyl-; alkyl; allyl-; alkylbenzyl-; haloalkyl-; haloalkenyl; 2-chloro-propenyl-; or a condensation product of ethylene oxide, propylene oxide, a mixture, or copolymer thereof.

Polymer Material (c)

Polymer Material (c) comprises a co-polymer material wherein at least one portion of the co-polymer has the structure:

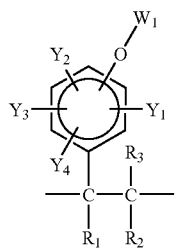

at least a fraction of the portion is polymerized with one or more monomers having a C=C moiety. Useful monomers include those independently selected for each of the units from the group consisting of acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, -amyl methacrylate, styrene, m-bromostyrene, p-bromostyrene, pyridine, diallyldimethylammonium salts, 1,3-butadiene, n-butyl acrylate, tert-butylamino-ethyl methacrylate, n-butyl methacrylate, tert-butyl methacrylate, n-butyl vinyl ether, tert-butyl vinyl ether, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl methacrylate, diethyleneglycol monovinyl ether, diethyl fumarate, diethyl itaconate, diethyl vinylphosphonate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-dodecyl vinyl ether, ethyl acid fumarate, ethyl acid maleate, ethyl acrylate, ethyl cinnamate, N-ethylethacrylamide, ethyl methacrylate, ethyl vinyl ether, 5-ethyl-2-vinylpyridine, 5-ethyl-2-vinylpyridine 1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, -isobutoxymethylacrylamide, N-isobutoxymethylacrylamide, -alkyloxymethylacrylamide, N-alkyloxymethylmethacrylamide, -vinyl-caprolactam, methyl acrylate, N-methylmethacrylamide, α-methylstyrene m-methylstyrene, o-methylstyrene, p-methylstyrene, 2-methyl-5-vinylpyridine, n-propyl methacrylate, sodium p-styrenesulfonate, stearyl methyacrylate, styrene, p-styrenesulfonic acid, p-styrenesulfonamide, vinyl bromide, 9-vinylcarbazole, vinyl chloride, vinylidene chloride, 1-vinylnaphthalene, 2-vinylnaphthalene, 2-vinylpyridine, 4-vinylpyridine, 2-vinylpyridine -oxide, 4-vinylpyrimidine, N-vinylpyrrolidone; and $W_1, Y_1-Y_4$ and $R_{1-12}$ are as in (a), above.

Within such materials, the ratio of any single monomer to any other monomer can be 1:99 to 99:1, preferably about 5:1 to 1:5, and more preferably 1.5:1 to 1:1.5.

Polymer Material (d)—Condensation Polymers

By the term "condensation polymers" is meant the following:

A condensation polymer of polymer materials (a), (b), or (c), wherein condensable forms (i.e., modified as noted below) of (a), (b), or (c), or mixtures thereof, is condensed with a second compound selected from the group consisting of phenols (preferably phenol, alkylphenol, arylphenol, cresol, resorcinol catechol, pyrogallol), tannins, (both hydrolyzable and condensed) novolak resins, lignin compounds, together with aldehydes, ketones or mixtures thereof, to produce a condensation resin product, that is a prepolymer of Polymer Material (d). This condensation resin prepolymer product is then further reacted by the addition of "Z" to at least a portion of it by reacting the resin prepolymer product with an aldehyde or ketone and a secondary amine producing a final adduct which can react with an acid and/or can be reacted with hydrogen peroxide to generate an amine oxide. The amine oxide can then be acid neutralized to form the hydroxylamine if desired.

While this condensation product is described for convenience as being prepared by a sequential reaction, it will be appreciated that these materials can be prepared by carrying out the necessary steps in any order, or simultaneously. However, the sequence described is preferred.

It is appreciated by those skilled in the art, that the alkenylphenolic moieties useable with the present invention can be either randomly distributed within the copolymer and terpolymer or can be synthesized to constitute a block orientated polymer, depending upon the methods and conditions used for polymerization.

Preferred aldoses, ketoses, and derivatives for use in the above materials include, without limitation, glucose, fructose, alditols such as mannitol, aribanose, mannose, ribose, ribitol, and the like. Acids such as aldonic and aldaric acids may also be employed. Disaccharides and polysaccharides that can be easily hydrolyzed under reaction conditions to one or more of the useful aldoses and ketoses may also be employed.

The surface treatment solutions of this invention comprise Polymer Materials (a), (b), (c), (d), or mixtures thereof (with the requirement that the Z moiety be present), which are preferably dissolved or dispersed in a carrier suitable for depositing or otherwise placing the Polymer Material on a oxidized organic surface.

These Polymer Materials useable with the present invention may be made soluble or dispersible in water or aqueous organic solvent-type carriers. They may therefore be employed as a treatment solution when dissolved in water or in an organic solvent such as, for example, ethanol. Preferably, the Polymer Material selected is used in aqueous solution as a carrier.

Accordingly, it may be desirable to provide or improve the water solubility or water dispersibility of the selected Polymer Material. In addition to employing the polyhydroxyalkyl-amine functionality present in at least one embodiment, this can preferably be done with an acid used for neutralization and/or complexation of a "Z" moiety thereof. Such acids may be organic or inorganic. Useful and preferred acids for this purpose include carbonic acid, acetic acid, citric acid, oxalic acid, ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; these may be employed alone or in combination with each other and may be neutralized by conventional acid-base reactions or by complexing. In a highly preferred embodiment, the addition of water to the neutralized, overneutralized or partially neutralized treatment compounds mentioned above results in a water soluble or dispersible solution or emulsion of the polymer useful for surface treatment.

Alternately, the final Polymer Material/polyphenol compounds useable with the present invention can be made water soluble or dispersible by neutralization of the phenolic group with an organic or inorganic base. Suitable bases for this purpose include tetra-alkylammonium hydroxides such as tetrabutylammonium hydroxide, tetra arylammonium hydroxide, sodium hydroxide, potassium hydroxide and the like.

Typically, the pH of the aqueous solution will vary from 0.5 to 8.5 In at least one embodiment, the aqueous solution will have a pH of from 5 to 7.5, and in other embodiments 6.5 to 7.0 both for the stability of the solution and for best results on the treated surfaces.

In at least one embodiment, the thickness of the final dry coating formed from the aqueous solution of the present invention will typically range from 1 to 10,000 angstroms (A) or greater, in other embodiments 1 to 1,000 angstroms, in yet other embodiments 1 to 100 angstroms, and in still yet other embodiments 1 to 50 angstroms. It should be understood that the thickness could vary throughout the coating and that the coatings could even be discontinuous. Also, it should be understood that the final coating could comprise multiple layers.

It is further contemplated that the treatment compounds of the present invention will generally be used in surface treatment compositions over a wide range of concentrations. It will be appreciated that the levels of use or useful ranges will vary with many factors well-known to the skilled artisan. Useful levels of the compositions of the present invention dissolved or dispersed in a carrier may be in the range of 0.0001% to 60 percent. In certain embodiments, useful levels typically include a dilute to moderate concentration of from 0.0005% to 10%, by weight, 0.002% to 0.1 percent, by weight, and 0.003% to 0.075% by weight, 0.005 to 0.05 percent, by weight and 0.015 to 0.04 percent, by weight.

Of course, the treatment solutions of the present invention can also comprise ingredients typically found in other similar treatment compositions, (e.g., conversion coating compositions) in addition to the polymer compound.

Application of the treatment compositions useable with the present invention in the treatment step to a desired surface can be carried out by any conventional method.

For example, the treatment composition can be applied by spray coating, roller coating, or dipping. The temperature of the solution applied can vary over a wide range, but is preferably from 70° F. to 160° F. After application of the treatment solution to the surface, the surface can optionally be rinsed, although good results can be obtained without rinsing after treatment.

After the treatment, the organic surfaces, such as SMC, retain between 50% and 100% of their hydrophilicity, indefinitely (i.e., for a period of greater than 12 months), under ambient conditions. In other embodiments, under ambient conditions, the organic surfaces retain at least 50% of their hydrophilicty, between 60 and 100% of their hydrophilicity, between 75 and 95% of their hydrophilicity, and between 85 and 90% of their hydrophilicity. Hydrophilicity being judged here as the % retention of full sheeting condition for rinse water. This means, a smooth, water-break free water sheet over a surface for a minimum of 10 seconds. By way of contrast, untreated SMC reverts to a hydrophobic condition within a few days to a few weeks.

Optionally, the treated surface is dried. Drying can be carried out by, for example, circulating air or oven drying. While room temperature drying can be employed, the use of elevated temperatures is preferred to decrease the amount of drying time required.

After drying (if desired) the treated surface is then ready for painting or the like. Suitable standard paint or other coating application techniques such as brush painting, spray painting, electro-static coating, dipping, roller coating, as well as electrocoating, may be employed. As a result of the treatment step of the present invention, the conversion coated surface has improved paint adhesion and adhesive adhesion for at least a predetermined period of time.

The practice of this invention may be further appreciated by consideration of the following, non-limiting examples, and the benefits of the invention may be appreciated by the examples set forth below.

EXAMPLE 1

A 0.25% v/v aqueous solution of Parcolene® 95 AT, a polyphenol resin composition in accordance with the present invention, available from Henkel Surface Technologies of Madison Heights, Mich., is prepared. The manufacture of Parcolene® 95 AT is described in U.S. Pat. Nos. 4,433,015, 4,517,028, 4,963,596, 4,970,264 and 5,039,770, which are incorporated herein by reference.

EXAMPLE 2

TPO (such as CA 186 AC from Basell) plaques are exposed to flame treatment. The flaming conditions are a propane gas flame at 2.0 feet per second speed, at a distance of 6.0 inches from burner face to the panel, and a 10% oxygen rich flame. The target surface energy is 46 dynes per centimeter, which can be confirmed at the time of flaming by the use of surface tension solutions as defined in ASTM D2578-84.

The 0.25% solution, in water, solution of Example 1 having pH=5.7 (as diluted) is used to treat the oxidized TPO surfaces.

1 to 4 hours after flame treatment, the TPO panels are dipped for 30 seconds half-way into the post-treatment solution, the upper half serving as a flame-only control area for each piece.

Two plaques are made and subsequently tested. One panel has the treatment solution blown dry with clean, compressed air. The second plaque is rinsed in spray tap water rinse for 30 seconds (top and bottom) and then blown dry.

The panels are tested for water contact angle (no paint), with the results shown below in Tables 1 and 2.

TABLE 1

Contact Angles on Unpainted TPO - Initial Contact Angle Data

| | Panel | | | | | | |
|---|---|---|---|---|---|---|---|
| | 1 | 2 | 3 | 4 | 5 | Avg. | S.D. |
| Unflamed Control | 111.0 | 111.0 | 111.0 | 108.5 | 111.0 | 110.5 | 1.12 |
| Control | 69.5 | 66.5 | 68.5 | 66.0 | 63.5 | 66.8 | 2.33 |

TABLE 1-continued

Contact Angles on Unpainted TPO - Initial Contact Angle Data

| | Panel | | | | | | |
|---|---|---|---|---|---|---|---|
| | 1 | 2 | 3 | 4 | 5 | Avg. | S.D. |
| (invention) Treated | 46.5 | 59.0 | 54.5 | 59.0 | 55.5 | 54.9 | 5.12 |
| (invention) Control (Rinsed) | 68.5 | 68.0 | 67.5 | 70.0 | 69.5 | 68.7 | 1.04 |
| (invention) Treated (Rinsed) | 62.5 | 60.5 | 58.0 | 59.0 | 61.0 | 60.2 | 1.75 |

TABLE 2

Contact Angles on Unpainted TPO - Initial Contact Angle Data, Averaged and Summarized

| Panel Description | Avg. | S.D. | Decrease from Flamed Control |
|---|---|---|---|
| Unflamed Control | 110.5 | 1.12 | — |
| Avg. Unrinsed Control | 66.9 | 2.07 | — |
| Avg. Rinsed Control | 69.4 | 1.40 | — |
| Avg. Unrinsed (Invention) | 54.9 | 5.12 | 12.0 |
| Avg. Rinsed (Invention) | 60.2 | 1.75 | 9.2 |

The panels treated as set forth in this example exhibit good water sheeting, which is full, bold water sheeting on the flamed side of the TPO plaque.

EXAMPLE 3

This experiment employs the same post-treatment composition as that of Example 2. The tested substrates are primed SMC from Budd, and the primer is a black paint material. The test specimens are flame-treated in the same manner as in Example 2 and then post-treated (within 1 to 4 hours) that same day. After air drying overnight, they are placed in a humidity cabinet.

As with Example 2, the lower half of each panel is treated and the upper half is left untreated as a control. One of the panels is merely exposed to the chemical and then blown dry without rinsing. The other panel is rinsed following exposure and before being blown dry. The results are shown in Table 3.

TABLE 3

| | Panel | | | | | | |
|---|---|---|---|---|---|---|---|
| | Spot 1 | Spot 2 | Spot 3 | Spot 4 | Spot 5 | Avg. | S.D. |
| Air Dry (invention) | 34.5 | 38.0 | 47.5 | 46.5 | 38.5 | 41.0 | ±5.7 |
| Rinsed (invention) | 36.5 | 35.0 | 38.5 | 35.0 | 41.5 | 37.3 | ±2.8 |
| Untreated Control Areas | 59.5 | 57.0 | 63.5 | 66.5 | 66.0 | — | — |
| Additional Untreated Control Areas | 60.5 | 64.5 | 64.5 | 60.5 | 59.5 | 62.2 | ±3.2 |

After 9 hours in the humidity cabinet, the panels treated in Example 3 still sheet water. Table 3 above shows the contact angles of the panels treated in Example 3 and the control areas.

EXAMPLE 4

The hydrophilicity of the panels of Example 3 were reevaluated after exposure to ambient conditions for an additional 16 months. The panels treated in accordance with the present invention exhibited excellent hydrophilicity, showing that the practicing of the present invention can substantially preserve the hydrophilicity of oxidized organic surfaces for over 16 months of ambient storage.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for increasing and maintaining for a predetermined period of time the hydrophilicity of an organic surface, said method comprising oxidizing at least a portion of the organic surface to form an oxidized surface portion, and treating the oxidized surfaces portion with an aqueous treatment solution comprising water-soluble and/or water-dispersible polyphenol resin, wherein the step of oxidizing at least a portion of the organic surface comprises exposing the organic surface to at least one treatment selected from the group consisting of acid etching treatment, corona discharge treatment, plasma treatment and flame treatment.

2. The method according to claim 1 wherein the aqueous solution has a pH of below 8.

3. The method of claim 1 wherein the polyphenol resin comprises an amine containing resin having at least 10 amine groups per molecule and a number average molecular weight of at least 1,000 g/mole.

4. The method according to claim 3 wherein amine containing resin is present in the aqueous solution in an amount of 0.005-10 wt. %, based on the total weight of the aqueous solution.

5. The method according to claim 4 wherein at least a fraction of amine containing resin contains polyhydroxy alkylamine functionality.

6. The method according to claim 5 wherein the polyhydroxy alkylamine functionality results from the condensation of an amine or $NH_3$ and a ketose, aldose or other alkylaminopolyhydroxy compound having from 2 to 8 carbon atoms followed by reduction to an amine.

7. A method according to claim 1 wherein the polyphenol is protonated.

8. A method according to claim 7 wherein the polyphenol comprises a protonated polyamine and the aqueous solution has a pH less than 8.

9. A method according to claim 3 wherein the resin includes a Z moiety, where at least a portion of the Z moiety contains a mono- or polyhydroxy alkyl-amine functionality resulting from the condensation of an amine or $NH_3$ and a ketose, aldose or other alkylaminopolyhydroxy compound having from 2 to 8 carbon atoms followed by reduction to an amine.

10. A method according to claim 9 wherein the Z moiety is:

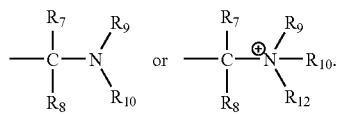

11. A method according to claim 10 wherein the resin has a molecular weight of 5,000-20,000 g/mole.

12. A method according to claim 8 wherein the organic surfaces comprise TPO.

13. A method of preventing the formation of coating defects in polymeric coated organic surfaces in a coating process comprising a plurality of steps, which steps occur prior to the polymeric coating of the surfaces and, which steps contact polymeric organic surfaces and metal surfaces, to which metal surfaces uncured resin particles have been applied, with a plurality of aqueous compositions in which resin particles released from the metal surfaces accumulate in suspension, the steps comprising:
  (1) oxidizing the polymeric organic surfaces to form an oxidized organic surface;
  (2) waiting for a period of time after forming the oxidized organic surface and then treating the oxidized organic surface with an aqueous treatment solution comprising water-soluble and/or water dispersible polyphenol resin;
  (3) contacting the oxidized treated surfaces with the plurality of aqueous compositions containing the particles; and
  (4) removing the surfaces from the plurality of aqueous compositions.

14. A method according to claim 13 wherein the plurality of aqueous compositions includes a first cleaner composition in which sealer particles are suspended.

15. A method according to claim 14 wherein the plurality of aqueous compositions is contacted with sealer resin on portions of the metal surface.

16. A method according to claim 15 wherein the aqueous compositions are used repeatedly in the process.

17. The method of claim 13 wherein the polyphenol resin comprises an amine containing resin having at least 10 amine groups per molecule and a number average molecular weight of at least 1,000 g/mole.

18. A method according to claim 13 wherein the aqueous solution have a pH of less than 8.5.

19. A method according to claim 17 wherein the resin includes a Z moiety, where at least a portion of the Z moiety contains a mono- or polyhydroxy alkyl-amine functionality resulting from the condensation of an amine or $NH_3$ and a ketose, aldose or other alkylaminopolyhydroxy compound having from 2 to 8 carbon atoms followed by reduction to an amine.

20. A method according to claim 13 wherein the oxidizing step comprises exposing the organic surfaces to a flame.

21. In a process for the assembly line coating of an assembly of parts comprising metal surfaces and polymeric organic surfaces, the process comprising the application of a hydrophobic sealer resin onto portions of metal surface parts combined in the assembly, contacting the assembly with a plurality of aqueous compositions, applying one or more finish coatings to the metal surfaces and polymeric organic surfaces of the assembly, and curing the coating, the improvement comprising:
  (1) oxidizing the surfaces of the polymeric organic surface parts;
  (2) treating the oxidized organic surfaces with a water soluble amine containing resin composition, wherein the resin has at least 10 amine groups per molecule and a number average molecular weight of at least 1000 g/mole;
  (3) contacting the assembly, comprising the oxidized treated organic surface parts and the metal parts on which hydrophobic sealer resin has been applied, with a plurality of the aqueous compositions;
  (4) after contacting the aqueous compositions with the assembly, recovering the plurality of aqueous compositions; and
  (5) reusing the plurality of aqueous compositions with additional assemblies comprising the oxidized organic surface parts and the metal parts having metal surfaces on which hydrophobic sealer resin has been applied.

22. A method according to claim 21 wherein the oxidation comprises contacting the polymeric organic surfaces with a flame at a temperate, distance and length of time to oxidize the surfaces such that the hydrophobic character thereof is converted into a substantially hydrophilic character.

23. A method according to claim 21 wherein the organic surface is polyolefin.

24. A method according to claim 21 wherein the resin includes a Z moiety, where at least a portion of the Z moiety contains a mono-or polyhydroxy alkyl-arnine functionality resulting from the condensation of an amine or $NH_3$ and a ketose, aldose or other alkylaminopolyhydroxy compound having from 2 to 8 carbon atoms followed by reduction to an amine.

25. A method of increasing and maintaining the hydrophilicity of an organic surface, the method comprising:
  producing a flame-treated organic surface;
  waiting for a first period of time;
  coating the flame-treated organic surface by applying a post-treatment solution coating, the solution comprising an aminosaccharide derivative polyphenol resin; and
  waiting for a second period of time, wherein the flame-treated organic surface having the coating retains a hydrophilicity range of 50-100% when measured by the full sheeting water test.

26. The method of claim 25, further comprising rinsing the flame-treated organic surface having the coating.

27. The method of claim 25, wherein the second period is at least 12 months.

28. The method of claim 25, wherein the flame-treated organic surface having the coating has a contact angle less than 62.5 degrees when measured by ASTM D2578-84.

29. The method of claim 25 further comprising applying a layer on the coating of the flame-treated organic surface having the coating, the layer being selected from a group consisting of paint, ink, and adhesive.

* * * * *

UNITED STATES PATENT AND TRADEMARK OFFICE
CERTIFICATE OF CORRECTION

PATENT NO. : 7,579,088 B2  Page 1 of 1
APPLICATION NO. : 11/001727
DATED : August 25, 2009
INVENTOR(S) : Held, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Fourteenth Day of September, 2010

David J. Kappos
*Director of the United States Patent and Trademark Office*